United States Patent
McCoy et al.

(10) Patent No.: US 6,623,025 B2
(45) Date of Patent: Sep. 23, 2003

(54) TRAILER HITCH WITH TRAILER HITCH ACCESSORY MOUNTING ASSEMBLY

(75) Inventors: Richard W. McCoy, Granger, IN (US); Katherine A. Adams, Mishawaka, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 35 days.

(21) Appl. No.: 09/872,902

(22) Filed: Jun. 2, 2001

(65) Prior Publication Data

US 2002/0180180 A1 Dec. 5, 2002

(51) Int. Cl.[7] ................................................. B60D 1/01
(52) U.S. Cl. ........................ 280/504; 224/519; 224/520
(58) Field of Search ................................ 224/519, 520, 224/488, 502, 504, 924; 280/504, 511

(56) References Cited

U.S. PATENT DOCUMENTS

| | | | |
|---|---|---|---|
| 3,858,775 A | | 1/1975 | Haas |
| 3,900,214 A | * | 8/1975 | Brockelsby .............. 280/414.1 |
| 4,380,344 A | | 4/1983 | Abbott |
| 4,412,635 A | | 11/1983 | Bateman |
| 4,576,395 A | | 3/1986 | Longoria |
| 4,770,155 A | | 9/1988 | Chamberlain et al. |
| 4,901,896 A | | 2/1990 | Speer |
| D331,214 S | | 11/1992 | Johnson |
| 5,190,195 A | | 3/1993 | Fullhart et al. |
| 5,232,133 A | | 8/1993 | Speer |
| 5,232,135 A | * | 8/1993 | Marren ........................ 224/509 |
| 5,303,857 A | * | 4/1994 | Hewson ....................... 224/506 |
| 5,423,566 A | | 6/1995 | Warrington et al. |
| 5,695,103 A | | 12/1997 | Duvernay et al. |
| 5,850,959 A | * | 12/1998 | Miller ......................... 224/535 |
| 5,857,602 A | | 1/1999 | Depot |
| 5,961,272 A | * | 10/1999 | Short .......................... 414/462 |
| 6,062,451 A | * | 5/2000 | Lassanske et al. .......... 224/502 |
| D426,186 S | | 6/2000 | McCoy et al. |

FOREIGN PATENT DOCUMENTS

| | | |
|---|---|---|
| DE | 3931 576 A1 | 9/1989 |
| GB | 2 260 111 A | 4/1993 |

* cited by examiner

Primary Examiner—Daniel G. DePumpo
(74) Attorney, Agent, or Firm—King & Schickli, PLLC

(57) ABSTRACT

A trailer hitch assembly includes a hitch bar and a hitch ball carried on the hitch bar. The hitch ball includes a ball head, a stem and a fastener for engaging the stem and securing the hitch ball to the hitch bar. The trailer hitch accessory also includes a trailer hitch accessory mounting assembly. That mounting assembly includes a bracket having a first aperture for receiving the shank of the hitch ball and two depending mounting flanges. Each of the mounting flanges includes a second aperture and a third aperture. In addition, the trailer hitch assembly includes a trailer hitch accessory having a trailer hitch accessory mounting bracket coupler. The coupler nests over the bracket. A pivot pin and a separate locking pin are each received in cooperating apertures in the coupler and bracket to complete the connection.

17 Claims, 2 Drawing Sheets

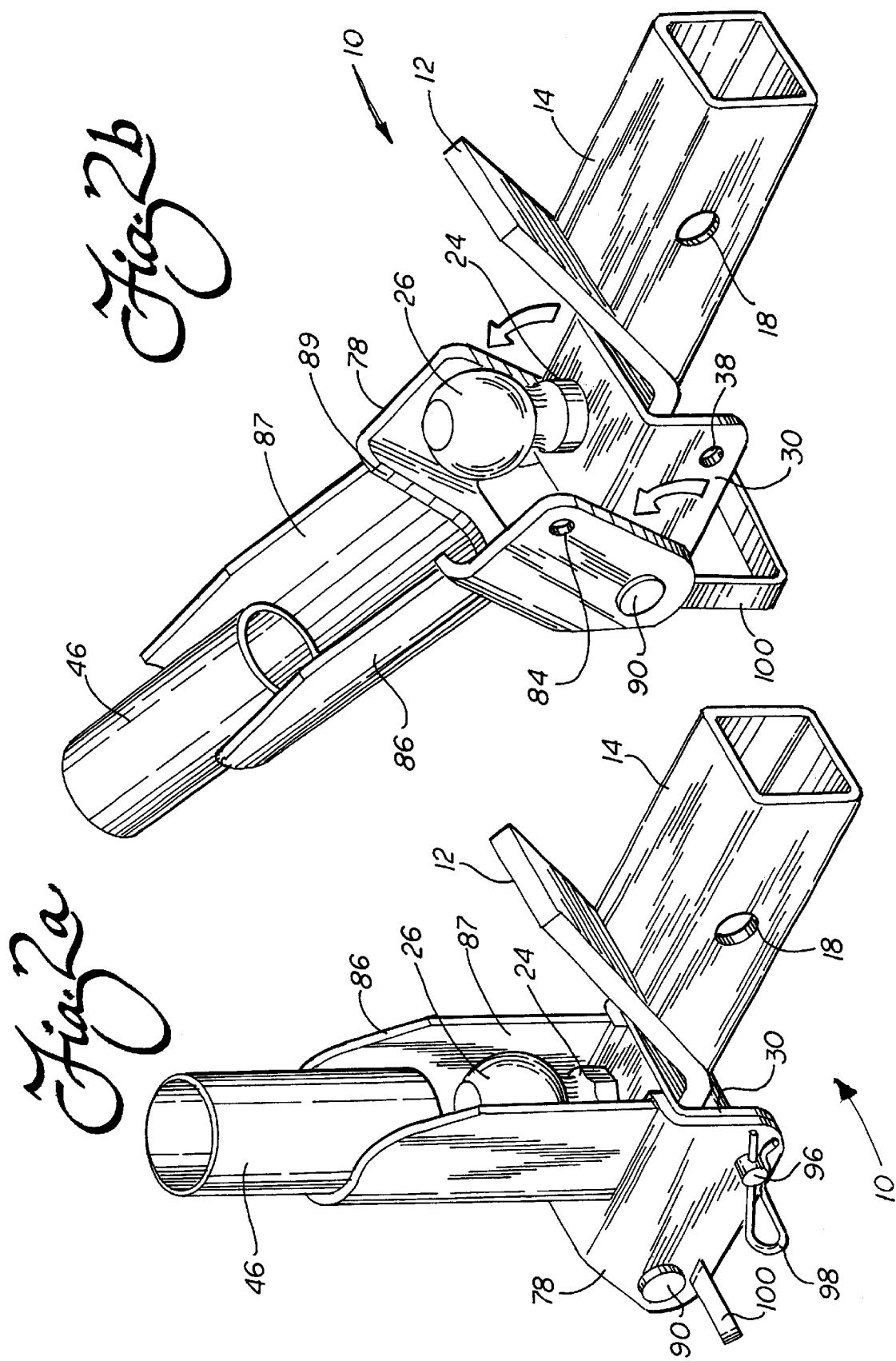

TRAILER HITCH WITH TRAILER HITCH ACCESSORY MOUNTING ASSEMBLY

TECHNICAL FIELD

The present invention relates generally to the trailer hitch field and, more particularly, to a trailer hitch incorporating an accessory mounting assembly that may be pivotally secured to a hitch bar without necessitating removal of the hitch ball carried on the hitch bar.

BACKGROUND OF THE INVENTION

Bicycle racks and other article carriers for attachment to passenger vehicle bumpers and trailer hitches are well known in the art. Examples of such devices are disclosed, for example, in U.S. Pat. No. 5,190,195 to Fullhart et al., U.S. Pat. No. 5,695,103 to Duvernay et al. and Des. U.S. Pat No. 426,186 to McCoy et al. As shown in the Duvernay et al. patent the trailer hitch accessory includes a mounting post adapted for receipt in the receiver box of the trailer hitch receiver assembly, an upright support post pivotally mounted to the mounting post by cooperating brackets and an article carrier at the upper end of the vertical support post for cradling a frame of a bicycle as well as holding gloves, keys and other small articles.

While such a device is useful for its intended purpose, it should be noted that by utilizing a mounting bar that is received in the receiver box use of this article carrier necessitates removal of the standard hitch bar. Many users find the back and forth swapping of the hitch bar and accessory mounting bar inconvenient or burdensome and, therefore, desire an alternative approach.

U.S. Pat. No. 5,857,602 to Depot discloses a bicycle/ski carrier that may be mounted to the standard hitch bar in the trailer hitch receiver box without necessitating the removal of the hitch ball. The device disclosed in the Depot patent includes a mounting block secured under the hitch ball, a vertical support post supporting the article carrier, a mounting frame for securing the post to the mounting block and a latching mechanism including cams, a lever, a latch plate and control handle. By operation of the handle the latch may be released to allow the vertical post and article carrier to pivot with respect to the hitch bar.

While the article carrier disclosed in the Depot patent mounts directly to the hitch bar without removing the hitch ball and therefore eliminates any need to remove either the hitch ball or the hitch bar in order to install the article carrier, it is not without its shortcomings. Specifically, the device utilizes a relatively complicated latching mechanism in order to provide and control its pivoting function. As such, the mechanism is relatively costly to produce. Further, the greater the number of parts, the more prone the mechanism is to becoming out of adjustment so as to not function properly. Thus, a need has been identified for a simple, yet reliable, article carrying accessory that may be mounted on a hitch bar carrying a hitch ball.

SUMMARY OF THE INVENTION

In accordance with the purposes of the present invention as described herein, a trailer hitch assembly is provided including a hitch bar and a hitch ball carried on the hitch bar. The hitch ball includes a ball head, a stem and a fastener for engaging the stem and securing the hitch ball to the hitch bar.

Additionally, the trailer hitch assembly includes a trailer hitch accessory mounting assembly. That mounting assembly includes a bracket having a first aperture for receiving the stem or shank of the hitch ball and two depending mounting flanges. Each of the mounting flanges includes a second aperture and a third aperture. A pivot pin is received in the second aperture in each of the mounting flanges. A locking pin is received in the third aperture in each of the mounting flanges. A first fastener is provided for securing the pivot pin in the second apertures of the mounting flanges. A second fastener is provided for securing the locking pin in the third aperture of the mounting flanges.

The trailer hitch assembly may also include a trailer hitch accessory having a trailer hitch accessory mounting bracket coupler. The coupler nests around the trailer hitch accessory mounting bracket when properly mounted in position. The coupler is substantially U-shaped in profile and includes two depending skirts. Each of the skirts includes a fifth aperture and a sixth aperture. The pivot pin is received in the fifth aperture in each of the depending skirts while the locking pin is received in the sixth aperture in each of the depending skirts.

Additionally, the trailer hitch accessory includes a support post and the coupler further includes an arcuate mounting flange for securing the support post to the coupler. The mounting flange is semicylindrical having a first end that is welded or otherwise secured to the coupler and a support post receiving socket that is welded or otherwise secured by a fastener to the support post. Of course, the trailer hitch accessory may also include an article carrier. That article carrier may take the form of a bike rack, a ski rack, a cargo box or basket, a folding table or any other useful article carrier construction appropriate for mounting to the trailer hitch assembly of a towing vehicle. As should be appreciated, the trailer hitch accessory is selectively displaceable between a pivoted position wherein the accessory pivots away from the vehicle to allow the opening of and access to a hatchback door, tailgate or trunk lid of the towing vehicle and an upright position for holding articles during vehicle operation.

In accordance with another aspect of the present invention, the mounting assembly alone is claimed.

In the following description there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIGS. 2a and 2b are detailed perspective views illustrating the pivoting movement of the support post and coupler on the bracket by which the post and coupler are mounted to the hitch bar.

Figure 1:
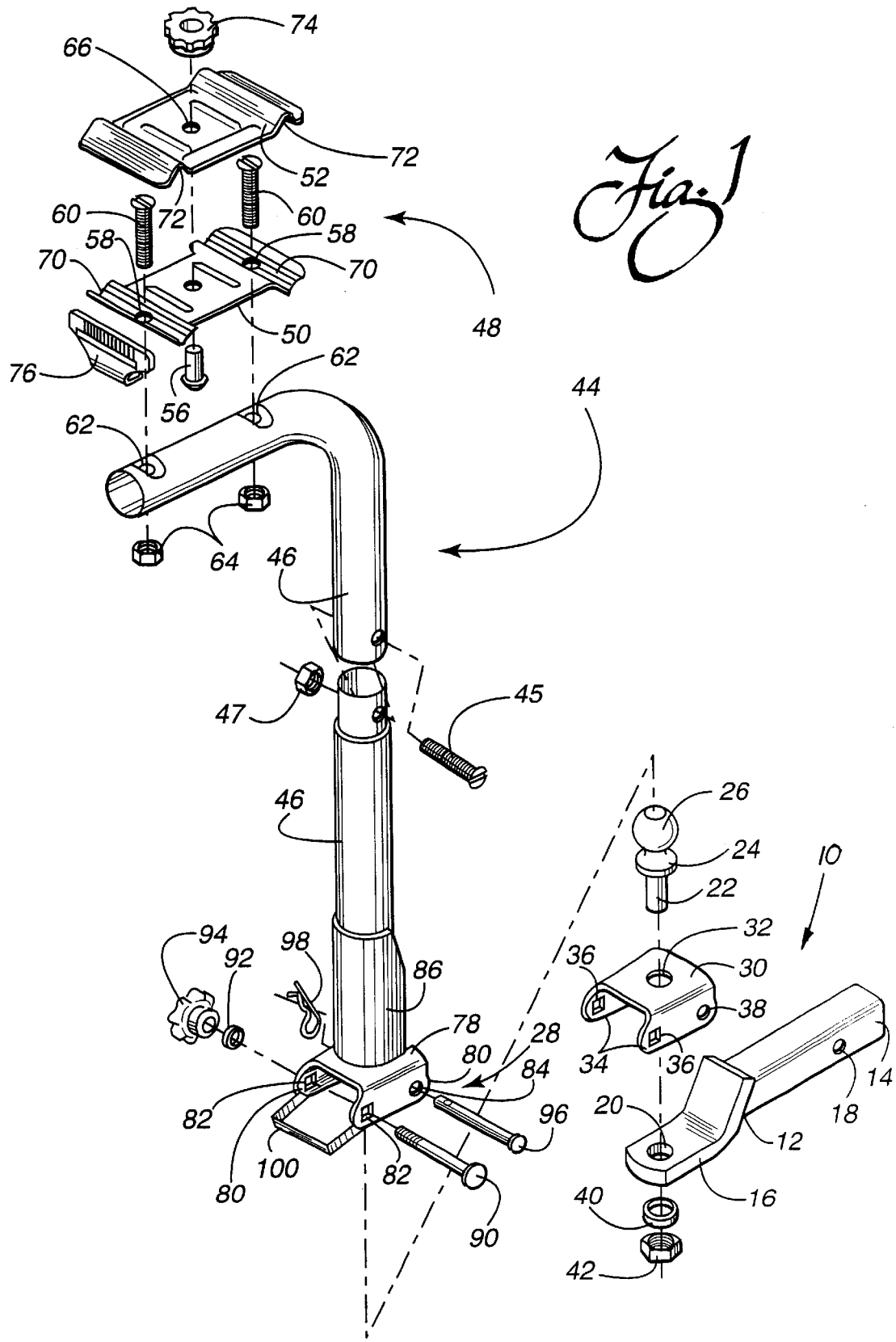
FIG. 1 is an exploded perspective view of the present invention.

Reference will now be made in detail to the present preferred embodiment of the invention, an example of which is illustrated in the accompanying drawing.

DETAILED DESCRIPTION OF THE INVENTION

Reference is now made to FIG. 1 showing an exploded perspective view of the trailer hitch assembly 10 of the invention. The hitch assembly 10 includes a hitch bar 12. Such a hitch bar 12 may be constructed from heavy gauge steel or cast ductile iron and may include a square tube bar section 14 and a head end 16. The bar section 14 includes an aperture 18 passing through the hitch bar 12. The end of the bar section 14 is inserted in the receiver box of a trailer hitch receiver assembly carried on a towing vehicle and a connecting pin and cooperating pin clip is inserted through the aperture 18 and cooperating aligned apertures in the sidewalls of the receiver box to complete the connection. The head end 16 of the hitch bar 12 includes an aperture 20 that receives the threaded stem 22 of a hitch ball 24. Of course, the hitch ball 24 also includes a ball head 26 which is received in a cooperating socket of a trailer coupler (not shown) of a type well known in the art that is carried on the frame of a trailer.

The hitch assembly 10 of the present invention also includes a trailer hitch accessory mounting assembly generally designated by reference numeral 28. The trailer hitch accessory mounting assembly 28 includes a bracket 30 having a first aperture 32 for receiving the stem 22 of the hitch ball 24. The bracket 30 further includes two depending mounting flanges 34. The mounting flanges 34 each include a second aperture 36 and a third aperture 38. When the hitch ball 24 is properly mounted on the head end 16 of the hitch bar 12, the stem 22 extends through the aperture 32 and the bracket 30 is captured between the ball head 26 and the head end 16. A lock washer 40 and nut 42 threadedly engaged on the stem 22 completes the connection.

A trailer hitch accessory, generally designated by reference numeral 44 may be pivotally secured to the bracket 30. The trailer hitch accessory 44 includes a substantially L-shaped upright post 46. The post 46 may be formed in two segments secured together by a cooperating screw 45 and nut 47 as illustrated in the drawing figure. Alternatively, the upright post 46 may be formed as a single piece or from more than two segments as desired. An article carrier, generally designated by reference numeral 48 is carried on the distal end of the post. The illustrated article carrier 48 is a bike rack. It should be appreciated, however, that other types of article carriers could be utilized including, but not limited to a cargo box or basket, a ski carrier, a snow board carrier and a folding or transportable table, bench or the like.

The illustrated carrier 48 comprises a pair of cooperating clamping plates 50, 52. Lower plate 50 includes one aperture 54 for receiving an upwardly extending bolt 56. Lower plate 50 also includes a pair of cooperating apertures 58 that receive bolts 60. Those bolts 60 also extend through cooperating apertures 62 in the post 46. Lock nuts 64 are threadedly received on the bolts 60 in order to secure the lower plate 50 in position on the post 46. As should be appreciated, this connection also serves to capture the upwardly extending bolt 56 between the lower plate 50 and the post 46.

The upper plate 52 includes a central aperture 66. The upper plate 52 is positioned over the lower plate 50 so that the upwardly extending bolt 56 extends through the aperture 66. Before positioning the upper plate 52 on the lower plate 50, the frame of one or two bicycles are positioned in the channels 70 formed in the lower plate 50. These channels 70 serve to cradle the bicycle frames and hold the bicycles in position on the carrier 48. With the bicycle frames located in the channels 70 the upper plate 52 is positioned over the lower plate 50. Cooperating channels 72 in the upper plate 52 receive the bicycle frames to hold the bicycle frames in position. A finger wheel 74 having a threaded hub is tightened on the bolt 56 extending upwardly through the aperture 66 in the upper plate 52 in order to complete the connection. As shown, the article carrier 48 may also include a safety reflector 76 if desired.

The article carrier 46 is mounted to the bracket 30 by means of a coupler 78. Coupler 78 is substantially U-shaped in profile and includes two downwardly depending skirts 80. Each skirt 80 includes a fifth aperture 82 and a sixth aperture 84.

The bracket 78 is mounted to the proximal end of the post 46. This is accomplished by providing an upwardly projecting mounting flange 86 in the form of a semicylindrical or open sleeve that is welded or otherwise securely mounted on the coupler 78. The flange 86 forms a socket for engaging the end of the post 46. The end of the post 46 is positioned in the socket and may be welded in position. Of course, if desired, an alternative arrangement such as a removable fastener could be utilized to complete this connection. In either event, the end of the post 46 is secured in the socket of the flange 86 in a relatively raised position so that the end of the post 46 will clear the top of the hitch ball 26 when the post is pivoted or in the upright position (see FIGS. 2a and 2b). The opening 87 in the sidewall of the flange or sleeve 86 and the opening 89 in the coupler 78 are sufficiently wide to allow passage of the hitch ball therethrough so as to also accommodate pivoting movement.

The trailer hitch accessory 44 is mounted on the bracket 30 by first positioning the coupler 78 over the bracket 30 so that it nests in position with the apertures 82 aligned with the apertures 36 and the apertures 84 aligned with the apertures 38.

A pivot pin 90 is inserted through the aligned apertures 82, 36. Pivot pin 90 includes a head at one end and threads at the opposite end. A lock washer 92 and cooperating finger wheel 94 with threaded hub are tightened on the threaded end of the pivot pin 90 to complete the connection. A locking pin 96 is inserted through the aligned apertures 80, 38. Locking pin 96 includes a head at one end and a through aperture adjacent the other end. The through aperture receives a pin clip 98 in order to complete the connection.

When the pivot pin 90 is received in the aligned apertures 36, 82 and the locking pin 96 is received in aligned apertures 80, 38, the trailer hitch accessory 44 is held in the upright position (see FIG. 2a) for transporting articles, in the illustrated embodiment, bicycles. When it is desired to access the trunk, tailgate, hatch lid or other operating component at the rear of the towing vehicle, the article carrier 44 may be pivoted out of the way. This is accomplished by removing the pin clip 98 from the locking pin 96 and then withdrawing the locking pin 96 from the aligned apertures 80, 38. The trailer hitch accessory 44 may then be pivoted about the pivot pin 90 away from the vehicle and toward the ground (see FIG. 2b). A strap 100 secured across the bottom of the coupler 78 engages the stem 22 or nut 42 on the hitch ball 24 to hold the support post 46 and carrier 48 in a pivoted position out of contact with the ground.

The trailer hitch accessory 44 may, of course, then be returned to the upright position and locked back in that place utilizing the locking pin 96 and cooperating pin clip 98 in the manner previously described at the will of the user. Obviously, the trailer hitch accessory 44 may also be completely removed from the bracket 30 by removing both the pivot pin 90 and the locking pin 96. This exposes the hitch ball 24 so as to allow trailer towing.

In summary, numerous benefits result from employing the concepts of the present invention. A relatively simple and inexpensive structure is provided for pivotally mounting a trailer hitch accessory 44 to a hitch bar 12 even when the hitch bar carries a hitch ball 24. The cooperating bracket 30, coupler 78, pivot pin 90 and locking pin 96 simplify conversion and operation for the convenience of the user. This effectively guarantees customer satisfaction over a long and reliable service life.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A mounting assembly for pivotally attaching a trailer hitch accessory to a hitch bar carrying a hitch ball, said mounting assembly comprising:
   a bracket including a first aperture for receiving a stem of said hitch ball and two depending mounting flanges, each of said mounting flanges including a second aperture and a third aperture, said bracket including a cavity that receives and nests over the hitch bar;
   a pivot pin received in said second aperture in each of said mounting flanges and engaging the trailer hitch accessory whereby the trailer hitch accessory is pivotally connected to said bracket; and
   a locking pin received in said third aperture in each of said mounting flanges and engaging the trailer hitch accessory whereby the trailer hitch accessory may be locked in position to prevent pivoting relative to said bracket.

2. The mounting assembly of claim 1 further including a first fastener for securing said pivot pin in said second aperture in each of said mounting flanges.

3. The mounting assembly of claim 2, further including a second fastener for securing said locking pin in said third aperture in each of said mounting flanges.

4. A trailer hitch assembly for pivotally connecting to a trailer hitch accessory comprising:
   a hitch bar;
   a hitch ball carried on said hitch bar, said hitch ball including a ball head, a stem and a fastener for engaging said stem and securing said hitch ball to said hitch bar; and
   a trailer hitch accessory mounting assembly, said trailer hitch accessory mounting assembly including;
      a bracket having a first aperture for receiving said stem of said hitch ball and two depending mounting flanges, each of said mounting flanges including a second aperture and a third aperture, said bracket including a cavity that receives and nests over the hitch bar;
      a pivot pin received in said second aperture in each of said mounting flanges whereby the trailer hitch accessory is pivotally secured to said trailer hitch assembly; and
      a locking pin received in said third aperture in each of said mounting flanges.

5. The trailer hitch assembly of claim 4, further including a first fastener for securing said pivot pin in said second aperture in each of said mounting flanges.

6. The trailer hitch assembly of claim 5, further including a second fastener for securing said locking pin in said third aperture in each of said mounting flanges.

7. The trailer hitch assembly of claim 6, further including a trailer hitch accessory having a trailer hitch accessory mounting bracket coupler.

8. The trailer hitch assembly of claim 7, wherein said coupler nests around said bracket.

9. The trailer hitch assembly of claim 7, wherein said coupler is substantially U-shaped in profile and includes two depending skirts, each of said skirts including a fifth aperture and a sixth aperture.

10. The trailer hitch assembly of claim 9, wherein said pivot pin is received in said fifth aperture in each of said depending skirts and said locking pin is received in said sixth aperture in each of said depending skirts.

11. The trailer hitch assembly of claim 10, wherein said trailer hitch accessory includes a support post and said coupler further includes a sleeve for securing said support post to said coupler.

12. The trailer hitch assembly of claim 11, wherein said sleeve includes an opening in a sidewall thereof having a width greater than the width of said hitch ball.

13. The trailer hitch assembly of claim 12, wherein said trailer hitch accessory includes an article carrier.

14. The trailer hitch assembly of claim 12, wherein said trailer hitch accessory is selectively displaceable between a pivoted position and an upright position and wherein said support post is secured in said sleeve at a height above said hitch ball when said trailer hitch accessory is in said upright position.

15. A trailer hitch assembly comprising:
    a hitch bar;
    a hitch ball carried on said hitch bar, said hitch ball including a ball head, a stem and a fastener for engaging said stem and securing said hitch ball to said hitch bar; and
    a trailer hitch accessory mounting assembly, said trailer hitch accessory mounting assembly including;
       a bracket having a first aperture for receiving said stem of said hitch ball and two depending mounting flanges, each of said mounting flanges including a second aperture and a third aperture, said bracket including a cavity that receives and nests over the hitch bar;
       a trailer hitch accessory including a trailer hitch accessory mounting bracket coupler and a support post, said coupler further including a sleeve for securing said support post to said coupler;
       a pivot pin received in said second aperture in each of said mounting flanges and engaging said trailer hitch accessory whereby said trailer hitch accessory is pivotally connected to said bracket and selectively displaceable between a pivoted position and an upright position; and
       a locking pin received in said third aperture in each of said mounting flanges and engaging said trailer hitch accessory whereby said trailer hitch accessory may be locked in said upright position.

16. The trailer hitch assembly of claim 15, wherein said coupler nests over said bracket when said trailer hitch accessory is in said upright position.

17. A trailer hitch assembly comprising:
    (a) a hitch bar;
    (b) a hitch ball carried on said hitch bar, said hitch ball including a ball head, a stem and a fastener for engaging said stem and securing said hitch ball to said hitch bar;

(c) a trailer hitch accessory mounting assembly, said trailer hitch accessory mounting assembly including:
a bracket having a first aperture for receiving said stem of said hitch ball and two depending mounting flanges, each of said mounting flanges including a second aperture and a third aperture;
a pivot pin received in said second aperture in each of said mounting flanges;
a locking pin received in said third aperture in each of said mounting flanges; and
(d) a trailer hitch accessory having a trailer hitch accessory mounting bracket coupler, said pivot pin engaging said coupler so as to allow pivotal movement of said trailer hitch accessory relative to said bracket.

* * * * *